Aug. 15, 1933.   A. G. GOLDBERG   1,922,159
WIND DEFLECTOR FOR VEHICLES
Filed Nov. 28, 1930

Inventor.
Abraham G. Goldberg
by Heard Smith & Tennant.
Attys.

Patented Aug. 15, 1933

1,922,159

UNITED STATES PATENT OFFICE 1,922,159

WIND DEFLECTOR FOR VEHICLES

Abraham G. Goldberg, Boston, Mass.

Application November 28, 1930
Serial No. 498,598

3 Claims. (Cl. 296—84)

This invention relates to wind deflectors for vehicles and particularly to deflectors which may be applied to side openings in the vehicle such as windows in the doors.

The principal object of the invention is to provide a wind deflector which may be readily installed in and detached from the vehicle without injury to or modification of the structure thereof.

A further object of the invention is to provide a wind deflector which is held by friction between the upper and lower sections of the window frame.

A further object of the invention is to provide a wind deflector which is provided with a supporting element adjustable to be received by various sized window openings and also has adjustable means to support deflector plates of various sizes.

A further object of the invention is to provide a wind deflector held by friction within a window opening in which the frictional contact members are self-aligning flat plates of substantial area which adapt themselves to irregularities of structure with the result that the pressure exerted on the plates is evenly distributed throughout their area.

Other objects and features will more fully appear from the following description in connection with the accompanying drawing, and will be particularly pointed out in the claims.

Figure 1:
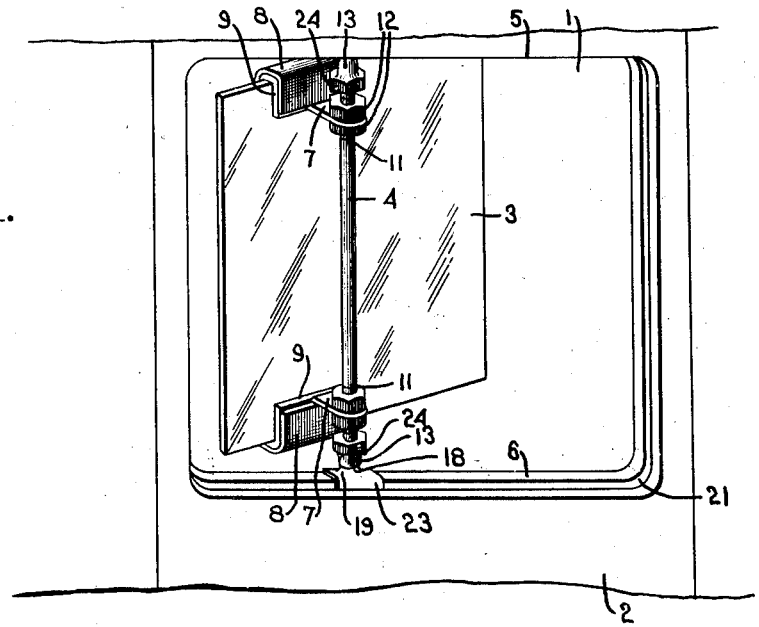
Fig. 1 is a general view in perspective of a preferred form of the invention installed in a motor car.
Figure 2:
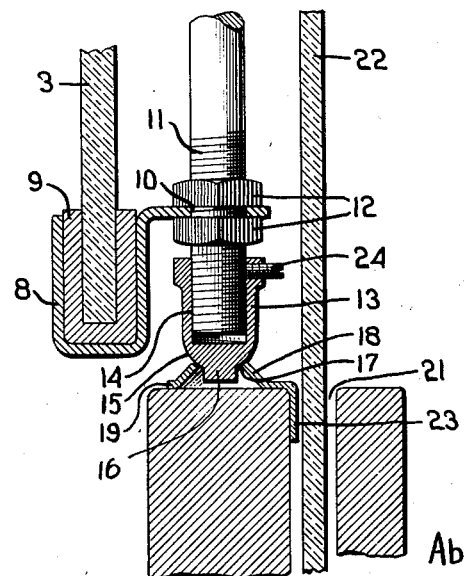
Fig. 2 is a cross sectional view through the lower portion of the device including a portion of the window frame.

Essentially the device consists of a rigid support or standard extending vertically between the upper and lower section of the window frame. The support is provided at its ends with extension members adjustable to expand the length of the support sufficiently to create pressure between the upper and lower sections of the window frame. The points of contact are provided with thrust plates which have universal connection with the ends of the support. The universal connections insure that the thrust plates will engage the window frame with an even pressure throughout their area. The support is also provided with a pair of laterally extending brackets which are adjustable longitudinally of the support and which engage the upper and lower edges of a deflector plate of glass or other suitable material to clamp it securely therebetween.

In order to adequately present the principles of the invention a specific embodiment thereof will be described. The device may be applied to any opening in the body of a vehicle where it is desired to obtain the protection from the wind afforded by such devices. The most common location is in the window opening 1 of the door 2 of the vehicle.

The invention is directed chiefly to the method of supporting the deflector plate 3 within the window frame. A rigid vertical support 4 extends between the upper section 5 and the lower section 6 of the window frame. The plate 3 is supported from the member 4 by means of a pair of laterally extending brackets 7 which have a channel section 8 at their outer ends which embraces the upper and lower edges of the plate 3. A pad 9 of rubber, cork or other suitable material is desirably inserted between the bracket and the plate 3 at the point where they engage in order to minimize the danger of breakage and to aid in establishing a firm union between the bracket and the plate.

The lateral portions of the brackets 7 are provided with apertures 10 through which the support 4 passes. The ends of the support are provided with screw threads 11. The brackets are adjustable longitudinally of the support 4 by means of nuts 12, one of which is above and the other below the brackets. The brackets 7 are adjusted into position to properly locate the plate 3 within the window frame. The lower nut at the lower end of the support and the upper nut at the upper end of the support are then adjusted slightly toward each other in order to firmly clamp the plate 3 between the brackets. The other nuts are then clamped firmly down upon the brackets thus establishing a rigid connection between the plate and the support 4.

The extreme ends of the supports are provided with extension members 13. The members 13 are provided with central apertures 14 extending from their inner ends part way of their length and having internal screw threads complementary to those on the ends of the support 4. The outer ends of the extension members are shaped substantially spherical for a portion of their area as at 15 and are provided with short cylindrical portions 16 preferably in axial alignment with the apertures 14.

The portions 16 of the extension members project into the apertures 17 formed in a raised portions 18 in generally flat thrust plates 19 which bear directly against the upper section 5 and the lower section 6 of the window frame. The apertures 17 are slightly larger in diameter than the portions 16. The peripheries of the apertures, therefore, engage the spherical portions 15 of the extension members which establishes a universal connection between the support 4 and the plates 19. The window frame is provided with a channel 21 in which the window pane 22 is received. In order to prevent the plates 19 from slipping laterally out of position and thus cause the device to become detached from the vehicle, the plates 19 are provided with downwardly bent lip portions 23 along their inner edge which extend into the channel 21.

To install the device the extensions 13 are adjusted to permit the support 4 to enter between the upper and lower sections 5 and 6 of the window frame. The extension members are then adjusted to expand the support to such extent that a firm pressure is exerted upon the thrust plates 19. The extension members are then locked upon the support 4 in any convenient manner as by means of set screws 24.

An important feature of the device is the manner in which the deflector plate may be adjusted to the desired angle with respect to the vehicle. This is accomplished by simply moving the plate into the desired position where it is held by the friction set up by the pressure existing upon the supporting member 4. This friction exists at the pivot point which is at the point of contact between the plates 19 and the extension members 13. Furthermore such adjustment is accomplished without affecting other adjustments of the device so that when the device is once installed it requires no further attention since the position of the deflector plate may be changed at will by simply moving it into the desired position.

The extension members 13 are of sufficient length to provide substantial elongation of the support 4 thereby providing means of adapting the device to a variety of window sizes. Inasmuch as the brackets 7 are adjustable along the support 4 a variety of sizes of deflector plates may be utilized in connection with a given supporting member. It will be noted that the assembled device when in position within the window frame does not interfere with the raising and lowering of the window pane 22. A device constructed under the principles of the invention, therefore, provides a wind deflector device which is efficient in operation, which may be readily installed upon the vehicle without injury thereto, and which may be left in its position thereon when not in use without interfering with the operation of the vehicle in any way.

Having thus described the invention, what is claimed as new, and desired to be secured by Letters Patent, is:

1. A wind deflector for vehicles in combination with a window frame therefor comprising a rigid vertical support extending between the upper and lower sections of the window frame, a deflector plate, a pair of lateral supporting brackets rigidly secured to said vertical support engaging the upper and lower edges of said plate clamping it therebetween, a pair of thrust plates engaging the upper and lower sections of the window frame, expansion members on the ends of said vertical support adjustable to produce expansive strain upon and having universal connection with said thrust plates whereby said thrust plates will bear with even pressure throughout their area upon the window frame thus firmly retaining the deflector plate in position therein.

2. A wind deflector for vehicles in combination with a window frame therefor comprising a rigid vertical support extending between the upper and lower sections of the window frame, a deflector plate, a pair of supporting brackets rigidly secured to and extending laterally from said supporting member having a channel portion at their outer end embracing the upper and lower edges of said deflector plate to secure it firmly therebetween, adjustable extension members on each end of said support having screw-threaded engagement therewith to permit expansion thereof, a pair of thrust plates at each end of said support having universal connection with said extension members and engaging the upper and lower sections of the window frame whereby upon expansion of said support the pressure acting upon the window frame will be evenly distributed over the area of said thrust plates.

3. A wind deflector for vehicles in combination with a window frame therefor having a channel to receive the window pane comprising a rigid vertical support extending between the upper and lower sections of the window frame, having its ends screw-threaded, a deflector plate, a pair of supporting brackets upon said vertical support, a pair of nuts associated with and operable to adjust said brackets longitudinally of the threaded end portions of said support, a channel portion on each bracket embracing the upper and lower edges of said deflector plate acting to secure it firmly therebetween, adjustable extension members on each end of said support having internal screw threads co-operating with the threaded ends of said support to permit expansion thereof, a pair of thrust plates at each end of said support having universal connection with said extension members and engaging the upper and lower sections of the window frame, a downwardly extending lip upon each thrust plate extending into the channel in the window frame whereby upon expansion of said support the pressure acting upon the window frame will be evenly distributed over the area of the thrust plates and the friction thus set up together with the action of the lip on the thrust plate will retain the wind deflector firmly in place within the window, and the universal connection between said extension members and said thrust plates will also permit angular adjustments of the deflector plate.

ABRAHAM G. GOLDBERG.